J. PORTEOUS.
NON-LEAKING BEARING FOR IMPELLER SHAFTS OF CENTRIFUGAL PUMPS.
APPLICATION FILED NOV. 20, 1919.

1,362,039.

Patented Dec. 14, 1920.

INVENTOR.
James Porteous
BY Booth & Booth
ATTORNEYS.

UNITED STATES PATENT OFFICE.

JAMES PORTEOUS, OF FRESNO, CALIFORNIA.

NON-LEAKING BEARING FOR IMPELLER-SHAFTS OF CENTRIFUGAL PUMPS.

1,362,039.

Specification of Letters Patent. Patented Dec. 14, 1920.

Application filed November 20, 1919. Serial No. 339,362.

*To all whom it may concern:*

Be it known that I, JAMES PORTEOUS, a citizen of the United States, residing at Fresno, in the county of Fresno and State of California, have invented certain new and useful Improvements in Non-Leaking Bearings for Impeller-Shafts of Centrifugal Pumps, of which the following is a specification.

My invention relates to the class of centrifugal pumps, and especially to the bearing for the impeller-shaft thereof.

It is essential in centrifugal pumps that the rapidly revolving impeller-shaft shall have a bearing, which while guarding against leakage of oil or air therethrough, yet permits the longitudinal movement of the shaft due to the constant automatic adjustment of the impeller under the water balance.

The object of my invention is to provide a simple and effective air and oil tight bearing for the impeller-shaft of these pumps; and to this end my invention consists in the novel non-leaking bearing hereinafter fully described by reference to the accompanying drawings, in which—

Figure 1:
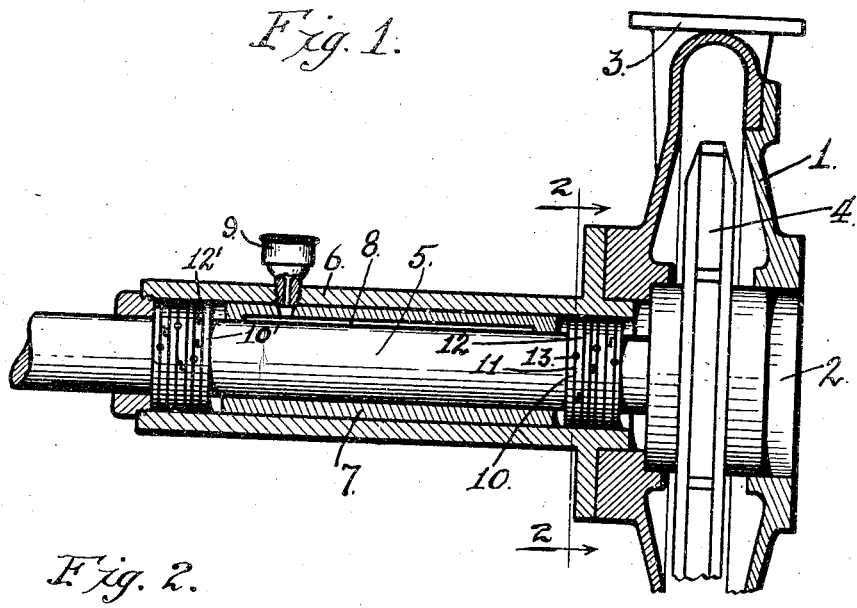
Figure 1 is a sectional view, broken, of a centrifugal pump, showing my improved bearing.
Figure 2:
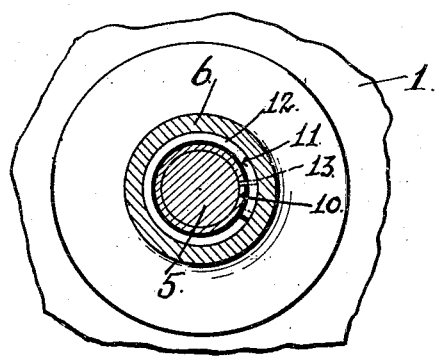
Fig. 2 is a section on the line 2—2 of Fig. 1.

Referring to Figs. 1 and 2, the numeral 1 indicates the casing of a centrifugal pump having the inlet 2 and outlet 3. 4 is the impeller and 5 is the impeller shaft.

Figure 3:
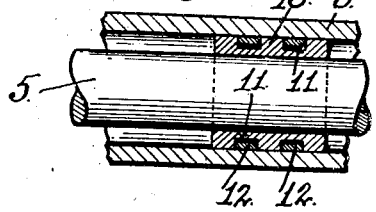
Fig. 3 is a sectional view of a bearing showing the application of two metallic expansion rings or packing.

6 is the bearing sleeve, having a bushing 7 of Babbitt metal, in which is made an oil recess 8, supplied with lubricant through the cup 9 carried by the sleeve. The bushing 7 in the form shown in Fig. 1, does not extend the full length of the sleeve 6. The impeller shaft has a head 10 which fits the sleeve beyond the inner end of the bushing. This head may be integral with the shaft, but, in practice, it is a separate member shrunk upon or otherwise rigidly fastened to the shaft. In the head 10 is made a peripheral groove 11 in which is fitted metallic packing in the form of an expansion ring 12. This ring is preferably loosely fastened by a dowel 13, so that it will rotate with the shaft, though this is not essential. There may be one or more of these expansion rings. In Fig. 1, I have shown three, while in Fig. 3 I have shown 2. The outer surface of these rings bear on the inner surface of the sleeve 6.

In practice, I duplicate the head and metallic packing, at the other end of the bearing, as indicated by the head 10' and rings 12', thus guarding against leakage at the outer end.

It will now be seen that no air or oil can pass by the expansion rings or metallic packings into the pump and yet the impeller shaft can move longitudinally as the impeller adjusts itself to the pressure or water balance. The head and rings next to the pump can be applied to the shaft before the latter is inserted in the bearing; and the head and rings at the outer end can be applied to the shaft after it is in place.

Figure 4:
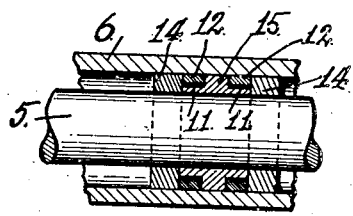
Fig. 4 is a sectional detail of a modification of the seating of the expansion rings or packing.
Figure 5:
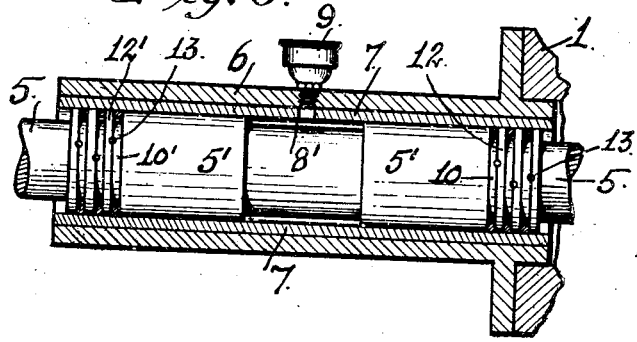
Fig. 5 is a sectional detail showing another modification of the seating of said rings or packing.

In Fig. 4, I show the ring-carrying head as made up of separate members, comprising end collars 14 and an intervening grooved sleeve 15. The seating grooves for the expanding rings may, if desired, be made in the shaft itself. In such case it is best to make the bearing part of the shaft of larger diameter, as is shown by 5' in Fig. 5, to avoid weakening the shaft. In this case, I can have the Babbitt metal bushing 7 the full length of the sleeve, and without any oil recess, an advantage in assembling. The shaft enlargement at 5' permits the oil recess to be made in said shaft itself, as shown in Fig. 5 at 8'.

I claim:—

1. In a centrifugal pump, the combination of a casing; a rotatable impeller therein; a rotatable impeller-shaft; a bearing in which the shaft is mounted for longitudinal movement to conform to the impeller adjustment under the water-balance; and an expansion ring carried by the shaft and impinging on the bearing to form a fluid tight joint preventing leakage of oil or air into the pump casing, while permitting the linear movement of the shaft.

2. In a centrifugal pump, the combination of a casing; a rotatable impeller in the casing; a rotatable impeller-shaft; a bearing in which the shaft is mounted for longitudinal movement to conform to the impeller adjustment under the water-balance; and expansion rings carried by the shaft and impinging on the bearing near each end thereof, to form fluid tight joints preventing the leakage of oil or air while permitting the linear movement of the shaft.

In testimony whereof I have signed my name to this specification in the presence of two subscribing witnesses.

JAMES PORTEOUS.

Witnesses:
M. K. HARRIS,
RICE C. GIBSON.